Feb. 9, 1954 K. SCHLESINGER 2,668,911

HIGH VOLTAGE GENERATOR

Filed May 19, 1948 2 Sheets-Sheet 1

INVENTOR.
Kurt Schlesinger,
BY
Foorman L. Mueller
Atty.

Feb. 9, 1954 K. SCHLESINGER 2,668,911

HIGH VOLTAGE GENERATOR

Filed May 19, 1948 2 Sheets-Sheet 2

INVENTOR.
Kurt Schlesinger,
BY
Foorman L. Mueller
Atty.

Patented Feb. 9, 1954 2,668,911

UNITED STATES PATENT OFFICE 2,668,911

HIGH VOLTAGE GENERATOR

Kurt Schlesinger, Maywood, Ill., assignor to Motorola, Inc., Chicago, Ill., a corporation of Illinois Application May 19, 1948, Serial No. 28,030

4 Claims. (Cl. 250—36)

This invention relates generally to high voltage generators and more particularly to a high voltage direct current power supply for a cathode ray tube.

In television receivers and other equipment in which cathode ray tubes are used, a high voltage direct current power supply is required for the tube for accelerating the electron beam. In television receivers where a bright image is required, a very high voltage is necessary to produce the desired intensity of the beam. In the past, such high voltages have been derived from the voltage kick produced in the deflection coils of a television receiver or from an entirely separate radio frequency power supply. Each of these systems have inherent disadvantages. In order to obtain high voltage from the deflection system, it is necessary to use a system having a transformer handling considerable power, which is inherently more expensive than recently developed circuits for transformerless deflection. Also, the interrelation between the amplitude of the deflection and the magnitude of the high voltage is undesirable. Another limitation of such systems is the relation between the step-up ratio and retrace speed which sets an effective maximum limit of about 9 kilovolts for high voltage systems of this type.

On the other hand, radio frequency power supplies have the disadvantage that a large amount of shielding is required and if such a system is not synchronized with the deflection system spurious patterns appear on the screen. Also the regulation of radio frequency power supplies is normally poor. In view of the above, it is desirable to provide a high voltage system which is of simple and inexpensive construction and which will provide high voltages not limited in magnitude and not restrict the design of the other components of the television receiver.

It is, therefore, an object of the present invention to provide an improved and simplified high voltage direct current power supply which may be constructed of inexpensive components.

Another object of this invention is to provide a high voltage power supply which is relatively free of spurious patterns and in which shielding is simplified.

A further object of this invention is to provide a power supply which produces very high voltages and in which special insulating means such as an oil bath is not required.

A feature of this invention is the provision of a pulse-type high voltage power supply which is free running but may be easily synchronized at some fraction of the scanning frequency.

A further feature of this invention is the provision of a pulse-type power supply which is capable of producing voltages of the order of 10 to 12 kilovolts by a single rectifier and of the order of 15 to 18 kilovolts by use of a voltage doubler.

A still further feature of this invention is the provision of an inductance unit for a high voltage power supply in which a conducting inlet is provided between the core and windings to prevent discharge between the sharp corners of the core and the high voltage portions of the windings.

Further objects, features and advantages will be apparent from a consideration of the following description taken in connection with the drawings in which.

In practicing the invention there is provided a high voltage direct current power supply including an oscillator adapted to produce high voltage pulses. The oscillator includes a tube the output of which is connected to a large inductance and arranged to produce an exponentially increasing current in the inductance. A winding is coupled to the inductance and to the control grid of the tube for blocking the tube when the current has reached a predetermined value. By varying the voltage applied to the cathode of the tube the time at which the blocking action takes place can be controlled. The sudden interrupting of the current in the winding produces a high voltage pulse in the inductance which will oscillate or ring until the tube again becomes conducting. This high voltage pulse is rectified by a single diode or a peak-to-peak double-diode to produce a steady direct current voltage. As the pulse will ring or oscillate, a negative pulse follows the original positive pulse which can be utilized in a voltage doubler circuit to produce a still higher direct current voltage. In order to prevent flash-over between the windings and between the windings and the core, the windings are separated and spaced to decrease the voltage difference between adjacent turns, and a grounded conducting inlet of cylindrical shape is provided about the core to decrease the danger of discharge from the sharp corners thereof.

Figures 1, 2, 3, 4:
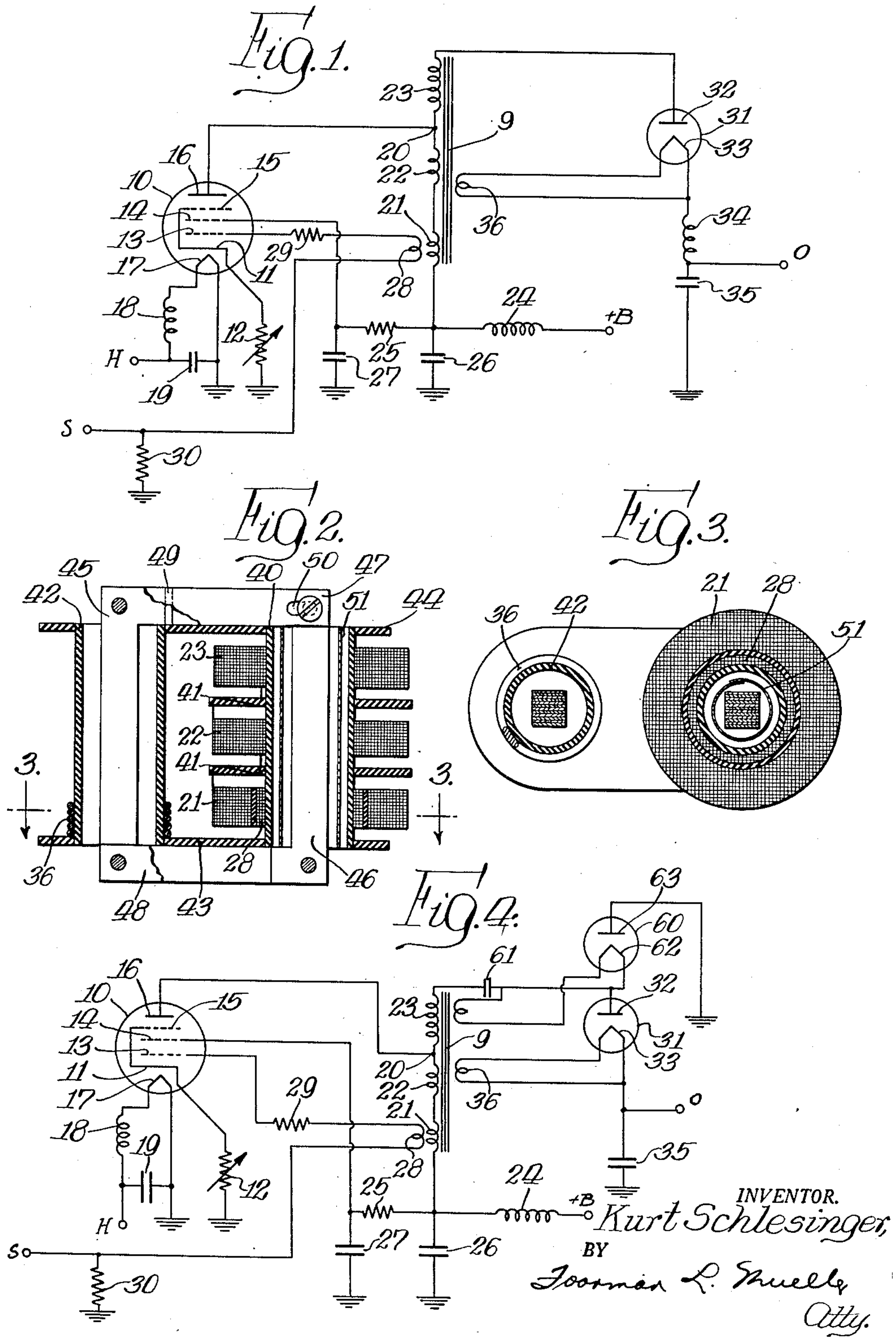
Fig. 1 illustrates a circuit diagram of a high voltage generator in accordance with the invention.
Fig. 2 is a cross-sectional elevational view of the inductance unit of the high voltage power supply.
Fig. 3 is a cross-sectional view along the lines 3—3 of Fig. 2.
Fig. 4 is a circuit diagram of a modified high voltage generator.

Referring now to the drawings, in Fig. 1 there is illustrated one form in which the pulse-type high voltage generator can be embodied. The generator includes an electron discharge valve 10 which is illustrated as a pentode tube, but it is to be noted that other tubes might be used and certain triodes would be suitable. The tube 10 includes a cathode 11 which is biased by variable resistor 12, a control grid 13, screen grid 14, suppressor grid 15 and plate 16. A heater 17 is provided for the cathode which is adapted to be energized by a source of energy marked H. A choke 18 and by-pass condenser 19 are provided for the heater. The plate 16 is connected to a tap 20 on inductance unit 9 which includes windings 21, 22 and 23. The windings 21 and 22 connect the plate 16 to a source of potential marker +B through choke coil 24. The screen grid 14 is also connected to the potential +B being connected through dropping resistor 25 and the choke 24. Condensers 26 and 27 provide high frequency by-pass. For providing feedback to the tube 10, a secondary winding 28 is inductively coupled to the winding 21 and is connected through a limiting resistor 29 to the control grid 13. The other end of the winding 28 is connected through resistor 30 to ground and to a terminal marked S to which synchronized pulses may be applied as will be further explained. For rectifying the pulses which are produced across the inductance unit 9, a diode rectifier tube 31 is provided having a plate 32 connected to the high potential point of inductance means and a cathode 33 connected through radio frequency choke 34 to condenser 35 across which a direct current potential is developed. This potential may be obtained at output terminal O. An auxiliary winding 36 is inductively coupled to the inductance unit to provide heater current for the triode 31.

Considering now the operation of the high voltage generator, it is apparent that the potential applied across the windings 21 and 22 will cause current to build up therein starting at a substantially linear rate, with the rate decreasing as the cycle proceeds. This current will approach a maximum value equal to the magnitude of the voltage thereacross (+B) divided by the plate resistance of the valve 10

$$\left(I_{\max}=\frac{E}{R_p}\right)$$

The time constant of this circuit will depend upon the inductance of the windings 21 and 22 and the plate resistance of the tube being directly proportional to the inductance and inversely proportional to the plate resistance $$\left(t=\frac{L}{R_p}\right)$$

During the charging cycle, the feedback winding 28 will have a positive voltage thereacross. The plate current will cause an increasing positive bias across the cathode resistor 12. The grid limiting resistor will, however, keep the actual grid-cathode voltage at zero. As the current in the plate winding approaches the maximum value, the rate of current build-up decreases and accordingly the voltage across the winding 28 will reduce. This voltage will, eventually, go below the cathode bias so that grid current will cease to flow. This results in a sudden decrease in the plate current resulting in further decrease in the voltage across the feedback winding 28 with the voltage reversing in phase. This effect is cumulative and continues to provide a relatively large negative voltage on the grid 13 to completely cut off the valve 10. The time when this cut-off is reached is determined by the cathode bias resistor 12 which, thus, controls the repetition frequency of the device. When the valve 10 is cut off, a transient oscillation occurs in the plate circuit with the energy stored in the windings 21 and 22 providing a high voltage pulse. The magnitude of the pulse depends upon the inductance and capacitance of the windings 21 and 22 and the current which was built up therein. The well known formula for this voltage is $E=I\sqrt{L/C}$, where I is the current in the inductance unit, L is the inductance and C is the capacity of the windings. The total voltage across the inductance unit 9 is increased by the winding 23 due to well known transformer action.

Figure 5:
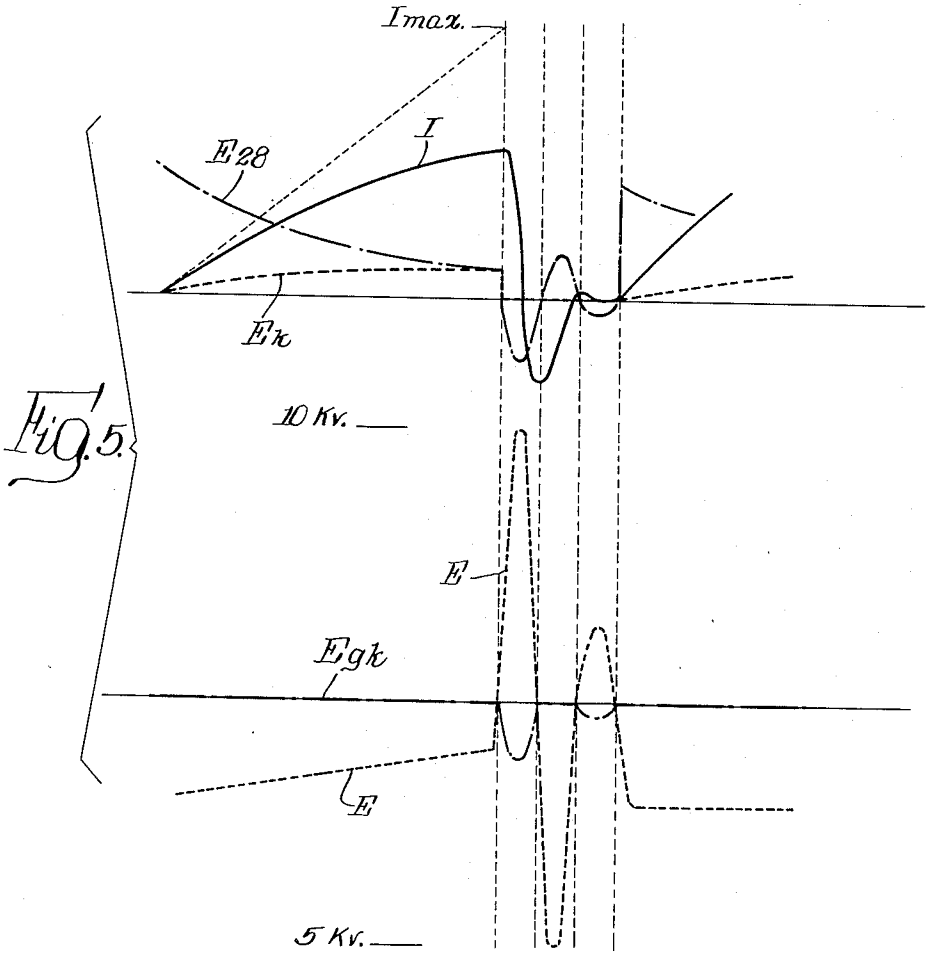
Fig. 5 is a curve chart showing operational characteristics of the high voltage generator.

In Fig. 5 there is illustrated a plurality of curves showing the voltages and currents in the generator. Curve I illustrates the current which is produced in the windings 21 and 22 showing that the current builds up substantially linearly at an incremental rate of $$\frac{E(B+)}{L}$$

until a predetermined value is reached when it tends to level off and then drops very suddenly in a free oscillation. The voltage across the inductance is shown by curve E having a steady negative value of about 200 volts just overcome by the +B source and a very high voltage peak produced when the tube is blocked and the current in the inductance oscillates. Curve $E_{28}$ illustrates the voltage across the secondary winding 28, curve $E_k$ indicates the cathode bias which is proportional to plate current, and curve $E_{gk}$ shows the grid cathode voltage of the tube 10. These curves illustrate the operation which was previously described, that is, as the current I approaches the maximum value the rate of increase drops with the result that the voltage $E_{28}$ decreases. This decreases the plate current providing a regenerative action causing the grid voltage to drop to a large negative value completely cutting off the tube. The current and voltage in the windings of the inductance then oscillate freely until the tube 10 again becomes conducting when the current will again build up substantially linearly in the inductance unit 9. Curve E of Fig. 5 shows that the voltage across the windings 21, 22 and 23 reaches a maximum of approximately 10,000 volts, this being produced when the voltage across the windings 21 and 22 reaches a value of approximately 6,000 volts. The ratio of these values depends, of course, upon the number of turns in the various windings with the maximum step-up being limited by the capacitance ratio of the tubes 10 and 31. During the oscillation a negative voltage peak is produced across the inductance unit which is of the order of 5,000 volts. This peak is less than the positive peak because of the losses produced in the system.

From the above it is apparent that various factors are involved in determining the maximum voltage which can be obtained in such a system. For maximum voltage, the inductance of the plate windings 21 and 22 should preferably be large, the current built up therein should be large and the capacity of the windings should be small. In order to provide a large current, the plate resistance of the tube should preferably be held low and sufficient time has to be provided for the current to build up. If, however, the inductance is large the time constant of the circuit will also be large and this results in a very slow repetition rate. Although a slow repetition rate may be suitable in certain applications, when used to provide high voltage for the cathode ray tube of a television receiver it is desired that the frequency of oscillations be related to the horizontal deflection frequency. It has been found that synchronization can be provided at frequencies which are sub-multiples of the horizontal deflection frequency but that satisfactory synchronization can be obtained only when the sub-multiple is of relatively low order as, for example, the third or fourth. Accordingly, it has been found satisfactory to use a frequency one-third of the horizontal deflection frequency or 5,250 cycles per second.

If the repetition frequency is too high, sufficient time is not provided for a large current to build up and even a large plate inductance will provide only a small voltage output. Theory shows that the optimum efficiency is obtained if the repetition rate ($f_{rep}$) is related to the time constant of the plate circuit ($t$) as follows:

$$f_{rep}=\frac{1.26}{t}$$

From these formulas and observed values the repetition rate can be determined. It has been observed that the maximum current which can actually be obtained is .55 times the theoretical maximum value. This is because the current rounds off as shown on the curve of Fig. 5. In a system operating from about 280 volts, the maximum current which can be obtained is about 45 milliamperes. Therefore, the theoretical maximum current would be approximately 82 milliamperes. The effective plate resistance, which is equal to the voltage divided by the maximum current, will therefore be 3500 ohms when using a system operating on 280 volts. The time constant being equal to the plate inductance, which is .76 henries, divided by the plate resistance will then be $$\frac{.76}{3500}$$

or 220 microseconds. Therefore, the repetition frequency for optimum efficiency will be $$\frac{1.26\times10^6}{220}$$

or of the order of 5700 cycles per second. One third of the line frequency or 5250 cycles per second has been found to be sufficiently close to this optimum value to provide good results.

The repetition rate can be varied by changing the plate resistance of the tube 10 which can be controlled by the biases applied to the screen grid 14 and to the cathode 11. In the structure shown, the resistor 25 which connects the screen grid to the source of potential is shown fixed, but the value thereof can be selected as desired. The resistor 12 in the cathode circuit is variable to provide a relatively fine adjustment of the frequency of the oscillator. For providing a course adjustment of the frequency the inductance of the windings 21 and 22 can be varied as by providing a variable air gap in the iron core on which these windings are placed as will be more fully explained.

In designing an inductance unit as required in Fig. 1, several problems are encountered in providing the inductance required with low capacity and preventing flash-over between windings and between the windings and the core. In Fig. 2 a structure is shown in which the tendency of flash-over is eliminated by dividing the windings 21, 22 and 23 in such manner that the maximum voltage across any winding is of the order of 3,000 to 4,000 volts. The windings 21 and 22 form one inductance portion being divided only to reduce the voltage across each winding. The windings 21, 22, 23 and 28 are mounted on common cylindrical insulating form 40 with the winding 21 being positioned about the winding 28. The windings are of the universal type so that the capacity thereof is low and the leads are carried from the outside of one winding to the inside of the next by discs 41 of insulating material which support the leads in positions to minimize flash-over. The winding 36 providing heater current for the rectifier is mounted on a form 42 which may be identical to the form 40. The cylindrical forms 40 and 42 together with the end plates 43 and 44 are positioned on a magnetic structure 39 including a plurality of generally L-shaped laminations. The L-shaped laminations make up two L-shaped sections 45 and 46 which may be secured together by connecting members 47 and 48 to form a substantially magnetic circuit. An air gap 49, however, may be provided in the magnetic circuit and the connecting member 47 may include an elongated opening 50 so that when the sections of the magnetic circuit are secured together the length of the air gap can be varied. This will obviously provide a change in the inductance of the windings and can, therefore, be used to provide a course adjustment of the repetition rate of the generator.

Although the core may be of various constructions it has been found suitable to construct each section of the core of 50 steel laminations approximately 5 mils thick. The structure is impregnated to insulate the laminations. As very high voltages are developed between the windings and the core and concentrated electrostatic fields are produced at the corners of the core, there is a tendency of flash-over between the sharp corners of the core and the winding. This tendency can be reduced by providing a cylindrical conductive inlet 51 about the core (Figs. 2 and 3) which produces substantially the same effect as though the core was round and had no sharp corners. The inlet must not be shorted as this would provide a closed turn about the magnetic circuit. The inlet 51 may be made of any conducting material such as brass and is preferably grounded to the core. The forms 40 and 42 on which the coils are wound should be of good insulating material being preferably made of thermosetting plastic material which is vacuum impregnated. By using such a construction, voltages of more than 10,000 volts were satisfactorily produced without flash-over. When used in a television receiver the inductance unit must be shielded, particularly if the unit is positioned close to the cathode ray tube. To provide highly effective shielding, double shields coaxial to the coils constructed of brass or copper can be used.

In Fig. 4, there is illustrated a modified arrangement in which a voltage doubler circuit is provided so that the negative as well as the positive voltage pulses can be used to thereby provide a greater direct current voltage. The system is generally the same as in Fig. 1 with the addition of a second diode 60. The pulse voltage from the inductance unit is applied through condenser 61 to the plate 32 of diode 31 and to the cathode 62 of diode 60. The plate 63 of the diode 60 is grounded and the cathode 33 of the diode 31 is connected to condenser 35 across which the direct current voltage is developed. The output voltage may be derived from terminal O. The rectifier doubler circuit illustrated is well known in the art and accordingly needs no further explanation. It is sufficient to state that during the negative pulses the voltage is built up across condenser 61 so that this voltage is added to the positive pulses and rectified in the rectifier 31 so that the combined voltage appears across condenser 35.

Figure 6:
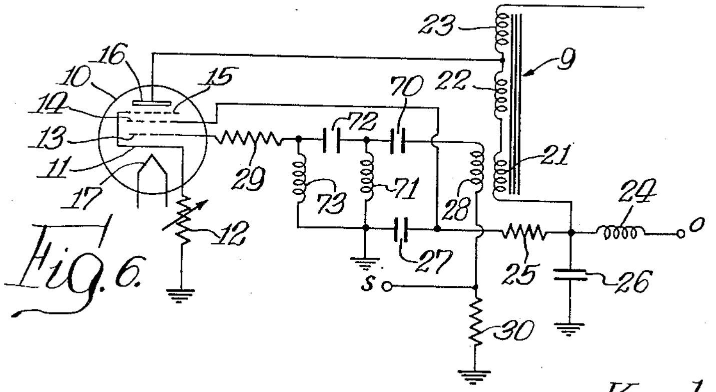
Fig. 6 is a circuit diagram illustrating a still further modification of the high voltage generator.

As the magnitude of the voltage pulses depends upon the rapidity with which the tube 10 is blocked the output voltage may be increased somewhat by sharpening the pulse applied to the grid of the tube 10 which controls the speed of cut-off. As the pulse voltage produced in the feedback winding 28 contains a large number of frequencies, a high pass filter system can be provided so that the high frequencies are applied to the grid with the result that the pulse applied to the grid will be narrow and the voltage pulse will, therefore, be of greater magnitude. Such a system is disclosed in Fig. 6 in which the circuit is generally similar to that of Fig. 1 with the exception that a high pass filter is provided between the feedback winding 28 and the grid 13 of valve 10. This filter includes two sections including respectively condenser 70 and inductor 71, and condenser 72 and inductor 73. As this filer will only allow high frequency pulses to be applied to the grid 13 the cut-off will be sharpened and the voltage peak will, therefore, be increased.

In high voltage generators constructed the following values were used in the circuit of Fig. 1:

| | |
|---|---|
| Tube 10 | 6BG6. |
| Resistor 12 | 100 ohms (variable). |
| Inductance 18 | 200 microhenries. |
| Condenser 19 | .05 microfarad. |
| Winding 21 | 900 turns #35 wire. |
| Winding 22 | 1,000 turns #35 wire. |
| Winding 23 | 1,800 turns #38 wire. |
| Choke 24 | 3.5 millihenries. |
| Resistor 25 | 12,000 ohms. |
| Condenser 26 | .05 microfarad. |
| Condenser 27 | .05 microfarad. |
| Winding 28 | 100 turns #35 wire. |
| Resistor 29 | 27,000 ohms. |
| Resistor 30 | 4,700 ohms. |
| Diode 31 | 1B3. |
| Choke 34 | Approximately 100 microhenries. |
| Condenser 35 | 500 micromicrofarads. |
| Winding 36 | 5 turns #38 wire. |
| Inductance of windings 21 and 22 in series. | .75 henry. |
| Inductance of windings 21, 22 and 23 in series. | 2.4 henries. |
| +B voltage | Approximately 280 volts. |

In these generators output voltages of more than 10,000 volts were obtained when using the system of Fig. 1 and more than 15,000 volts when using a voltage doubler system as illustrated in Fig. 4.

The system has been satisfactorily used in experimental television receivers with negative synchronization pulses of about 10 volts being applied to terminal S from the horizontal deflection coils of the scanning yoke. The synchronization of the system is not unduly critical and in a system as disclosed adjusted for operation on 230 volts, variation of +B voltage in the range from 200 to 320 volts does not disturb the synchronization of the system. This provides sufficiently wide tolerance for satisfactory use. The voltage pulses produced in the inductance unit are of sufficient width so that very good direct current voltage regulation is provided. The equivalent generator impedance is 7 megohms. This is to be contrasted with prior systems in which pulses of very short duration have been rectified to provide high voltage as in such systems the regulation is very poor and special direct current feedback means must be provided for satisfactory operation in a television receiver.

The construction of the inductance unit is such that the high voltages may be produced with the windings in air without danger of flash-over. This eliminates the need for an oil bath which is necessary in many high voltage systems to prevent discharges which would be apparent in a television picture and, therefore, prevent the satisfactory use of a high voltage system for television.

It is, therefore, seen that I have provided an improved high voltage generator which is capable of producing direct curent voltages of the order of 10 to 12 kilovolts from a supply of less than 300 volts using only two tubes and not requiring special insulating means. Alternatively voltages over 15 kilovolts can be provided by the addition of a second rectifier in a voltage doubler system.

While I have disclosed certain embodiments of my invention which are illustrative thereof, it is obvious that various changes and modifications can be made therein without departing from the intended scope of the invention as defined in the appended claims.

I claim:

1. A high voltage power supply comprising an inductance unit including a ferromagnetic core and first, second and third windings thereon, said core including a plurality of laminations positioned to provide two sections each having rectangular cross section and sharp edges, means for adjustably securing said sections together to provide a magnetic circuit having an air gap which is of variable length to thereby provide adjustment of the inductance of said windings, a conducting inlet positioned between said core and said windings for reducing the tendency for flash-over from the concentrated electrostatic fields at said sharp edges of said core, an electron discharge valve having input and output electrodes, a source of potential, means connecting said first winding in series with said source of potential across said output electrodes, a feedback circuit including said second winding connected to said input electrodes, said feedback circuit being arranged to block said valve when the current in said first winding reaches a predetermined value, so that the energy in said inductance unit oscillates freely to provide high voltage pulses, said feedback circuit rendering said valve conducting after said oscillation has continued for at least one cycle to produce positive and negative pulses and means connecting said first and third windings in series so that the voltages therein are substantially in phase.

2. A high voltage generator, including in combination, an inductance unit including a ferromagnetic core and first, second and third windings thereon, said core including a plurality of laminations positioned to provide a closed magnetic circuit having a cross-section with sharp edges, said windings being positioned about said core and spaced and insulated from said core and from each other, a conducting inlet positioned between said core and said windings for reducing the tendency for flash-over from the concentrated electrostatic fields at said sharp edges of said core, an electron discharge valve having input and output electrodes, a source of potential, means connecting said first winding in series with said source of potential across said output electrodes, a feedback circuit including said second winding connected to said input electrodes, said feedback circuit providing a voltage for blocking said valve when the current in said first winding reaches a predetermined value whereby the energy in said inductance unit produces transient high voltage ringing oscillations in said windings of said inductance unit, said feedback circuit rendering said valve conducting and after said oscillation has continued for at least one cycle, means connecting said first and third windings in series so that the voltages thereacross are substantially in phase and combined to provide a high voltage.

3. A high voltage power supply including in combination, an inductance unit having a ferromagnetic core, first, second and third disc-like windings positioned in spaced relation on said core, said core being of such configuration to provide a closed magnetic circuit and having sharp edges, a conducting inlet positioned about said core within said windings for reducing the tendency for flash-over from said sharp edges to said windings, an electron discharge valve having input and output electrodes, a source of potential, means connecting said first and second windings in series with said source of potential across said output electrodes, a feedback circuit connected to said input electrodes including a coil inductively connected to said windings, said feedback circuit providing a voltage for blocking said valve when the current in said windings reaches a predetermined value so that the energy in said windings produces a transient high voltage oscillation having positive and negative peaks, said feedback circuit providing a voltage for rendering said valve conducting after said oscillation has continued for at least one cycle, and means connecting said first, second and third windings in series so that the voltages thereacross are additive.

4. Generator means for a high voltage power supply which includes rectifier means having first and second portions for rectifying positive and negative voltage pulses respectively, and means for adding the rectified voltages to produce a high direct current potential, said generator means producing an oscillating current wave and including in combination, an electron discharge valve having a cathode, a control grid and a plate, inductance means connecting said plate to a source of potential, adjustable means connected to said cathode for providing a bias thereto for controlling the repetition rate of said generator means, a winding coupled to said inductance means and to said control grid for applying a bias thereto which normally holds said control grid positive with respect to the voltage on said cathode so that said valve conducts and increasing current is provided in said inductance means to form the trace portion of the current wave, said voltage across said winding decreasing when said current in said inductance means reaches a predetermined value so that said grid becomes negative with respect to said cathode and said valve is cut off interrupting said current in said inductance means to form the retrace portion of the current wave, said inductance means having a plurality of spaced winding sections so that the distributed capacity thereof is low and such capacity resonates with the inductance of said inductance means at a frequency substantially greater than the frequency of said oscillating current wave to provide natural ringing oscillations therein at such a high frequency that at least one complete cycle of ringing oscillations takes place in said inductance means during said retrace portion of the wave to provide positive and negative voltage pulses thereacross, said ringing oscillation providing a voltage across said winding which produces a positive bias at said control grid so that said valve again conducts to repeat the cycle.

KURT SCHLESINGER.

References Cited in the file of this patent

UNITED STATES PATENTS

| Number | Name | Date |
|---|---|---|
| 1,805,534 | Troy | May 19, 1931 |
| 1,834,898 | Boyajiar | Dec. 1, 1931 |
| 2,130,441 | Wohlfarth et al. | Sept. 20, 1938 |
| 2,137,356 | Schlesinger | Nov. 22, 1938 |
| 2,276,832 | Dome | Mar. 17, 1942 |
| 2,306,888 | Knick | Dec. 29, 1942 |
| 2,352,988 | Wilcox | July 4, 1944 |
| 2,373,165 | Cawein | Apr. 10, 1945 |
| 2,386,548 | Fogel | Oct. 9, 1945 |
| 2,420,857 | Brown | May 5, 1947 |
| 2,446,032 | Watts et al. | July 27, 1948 |
| 2,449,969 | Wright | Sept. 28, 1948 |
| 2,466,782 | Robins | Apr. 12, 1949 |
| 2,466,784 | Schade | Apr. 12, 1949 |
| 2,478,744 | Clark | Aug. 9, 1949 |
| 2,493,044 | Thorne | Jan. 3, 1950 |
| 2,524,530 | Lawson | Oct. 30, 1950 |
| 2,538,541 | Tourshon | Jan. 16, 1951 |
| 2,556,027 | Carson | June 5, 1951 |

OTHER REFERENCES

TV-HV-RF Supplies, R. C. A. Review, Mar. 1947, vol. 8, No. 1.